Aug. 10, 1926.
H. F. KHOENLE
1,595,102
CLICK MECHANISM FOR FISHING REELS
Filed Nov. 14, 1924
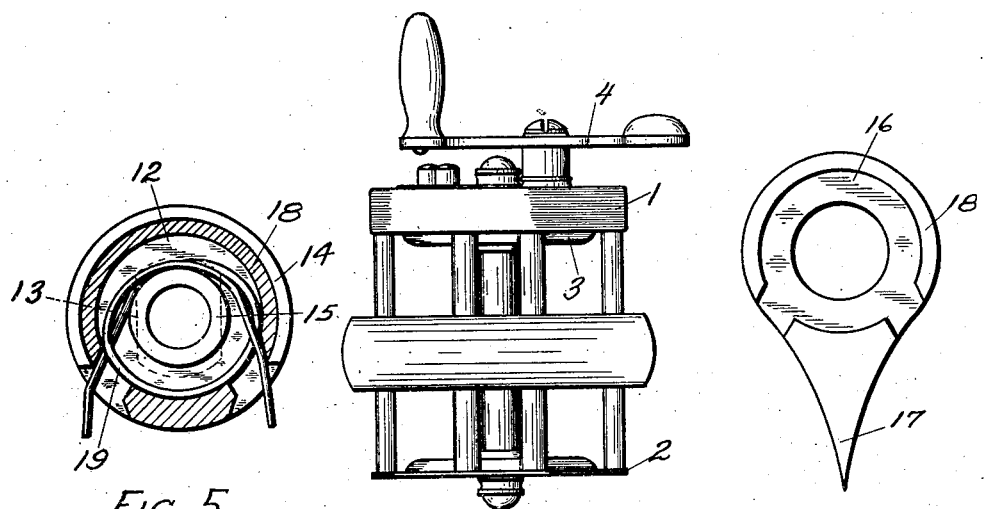
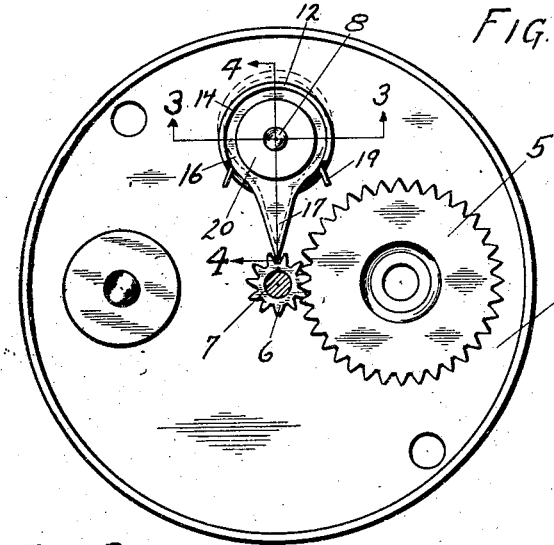
INVENTOR.
Herman F. Khoenle.
BY
ATTORNEY.
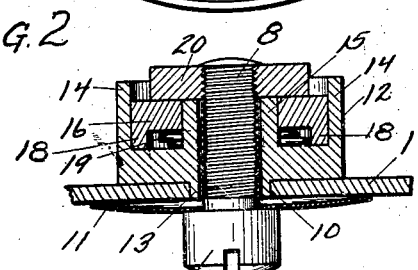

Patented Aug. 10, 1926.

1,595,102

UNITED STATES PATENT OFFICE.

HERMAN F. KHOENLE, OF AKRON, OHIO, ASSIGNOR TO THE ENTERPRISE MANUFACTURING COMPANY, OF AKRON, OHIO, A CORPORATION OF OHIO.

CLICK MECHANISM FOR FISHING REELS.

Application filed November 14, 1924. Serial No. 749,865.

This invention relates to an improved form of click mechanism for use on fishing reels. Heretofore the usual form of device for this purpose has consisted of a flat spring, the end of which engages the pinion or ratchet on the spool. The form of device is objectionable as the spring is subject to crystallization and breakage, which is one of the chief faults of the usual click mechanism.

In accordance with the present invention, however, the flat spring has been dispensed with, and in its place is provided a dog actuated by a coil spring, carried in an adjustable cup or housing so as to be movable toward and away from clicking position.

These and other objects and advantages will be apparent from the description and drawings of the preferred embodiment of the invention, but it will be understood that the invention is subject to modifications and alterations within the scope of the claims appended hereto.

In the drawings:—

Figure 1 is a side elevation of a fishing reel of any preferred type showing the location of the click mechanism.

Figure 2 is a plan view of the front plate which houses the click mechanism, the pinion on the spool shaft being shown in its proper position relative to the drive gear.

Figure 3 is an enlarged section on the line 3—3 of Figure 2.

Figure 4 is an enlarged section on the line 4—4 of Figure 2.

Figure 5 is a view looking into the cup or housing showing portions of the dog in section.

Figure 6 is a view looking at the underside of the dog.

The fishing reel illustrated is of the usual construction provided with a front plate 1 and a back plate 2, between which is mounted the rotary spool 3. The handle or crank for actuating the spool is indicated at 4, to which is attached the drive gear 5 located within the front plate. The gear 5 engages a small pinion or ratchet 6 which is carried on the end of the spool shaft 7 and drives the spool.

The improved form of click mechanism is shown in the present application as mounted upon the front plate and engaging the pinion for driving the spool, but it can be carried upon the back plate and engage a ratchet for that purpose. In the drawings the device is carried upon a pin or bolt 8, the outer end of which is provided with an operating head or knob 9 and the stem of which is received in a slot 10 formed in the top plate so that the entire mechanism may be moved toward and from the pinion 6. A spring washer 11 is received beneath the head 9 and provides a means for yieldingly holding the click mechanism in adjusted position in the slot.

The click mechanism is carried in a shiftable support or housing which is preferably cup-shaped and is designated by the numeral 12, which is movable over the front plate and which is guided by a squared portion 13 which rides in the slot 10. The cup or housing is provided with an upstanding arcuate flange 14 which opens toward the pinion, and also with a central boss or bearing 15. Within the flange and upon the boss 15 is rotatably mounted a dog or pawl 16, the tail 17 of which will engage the pinion when it is moved to its inner position as shown by full lines in Figure 2, the outer or free position of the housing being shown in dotted lines. The under surface of the dog is removed about the boss 15, so as to provide an arc shaped flange 18 which is confined within the flange 14. A light coil spring 19 is placed within the chamber thus provided, the ends of the spring projecting outwardly at the ends of the flanges 14 and 18. A nut 20 is received upon the end of the bolt 8 and holds the parts in assembled position the bolt being swedged over the nut.

When the click mechanism is to be put in operation, the cup is moved toward the pinion as shown in Figure 2 so that the tail of the dog engages therewith. Rotation of the spool will cause the pawl to vibrate giving out the clicking noise desired. In its vibration the pawl winds up the spring between the flange 18 at one side of the cup and the flange 14 at the other. The pawl is held in central position by the ends of the coil spring bearing against the ends of the flanges 14 and 18. Two springs may be substituted for the coil spring if it is desired to obtain different spring pressures on the dog in two directions. The click mechanism operates in both directions as will be understood.

The improved device operates in a more efficient manner than the flat springs of the prior art as crystallization of the spring is obviated. It works equally well in both directions and gives a pleasing sound. The mounting of the click mechanism in compact form as shown, is an improvement over previous devices. The cup or housing presents a compact and unitary device for the purposes set forth.

It will be understood that changes and modifications may be made in embodiments of the invention and it is not necessarily restricted to the exact form as shown and described.

What is claimed is:—

1. In a fishing reel the combination with a spool and pinion of a click mechanism comprising a housing movable toward and from the pinion, a dog carried by the housing, the tail of the dog engaging the pinion in one position, and a spring bearing against the dog.

2. In a fishing reel, the combination with a spool and pinion, of a click mechanism comprising a housing movable toward and from the pinion, a bearing upon the housing, a dog rotatably mounted upon the bearing, a coil spring within the housing acting upon the dog and a tail on the dog engageable with the pinion.

3. In a fishing reel a click mechanism comprising a cup shaped housing having an arcuate flange, a dog within the housing having a flange engaging the flange upon the housing, a coil spring in the housing, the ends of the spring lying within and compressible between the flanges as the dog moves in either direction.

4. In a fishing reel, a click mechanism comprising a cup shaped housing having a flange, a dog within the housing, a bearing on the housing upon which the dog is rotated, a coil spring within the housing, the spring being compressible between the dog and the flange as the dog vibrates.

5. In a fishing reel having a plate and a ratchet for the spool within the plate, a cup shaped housing adjustably mounted in the plate, a central bearing in the housing, a dog pivotally mounted in the bearing and a spring tending to hold the dog directed toward the pinion.

6. A click mechanism for fishing reels comprising a housing having a flange about a portion of its periphery, a dog seated within the flange and a coil spring the ends of which project beyond the flange and are compressible between the dog and the flange.

7. A click mechanism for fishing reels comprising a housing having a flange about a portion of its periphery, a dog seated within the flange, and a spring the free end of which projects beyond the flange and is compressible between the dog and the flange.

8. A click mechanism for fishing reels, comprising a plate, a ratchet, a support movable upon the plate toward and from the ratchet, a dog carried by the support and adapted to engage the ratchet in one position, and a spring also carried by the support, said spring bearing against the dog.

9. A click mechanism for fishing reels, comprising a plate, a ratchet, a support movable upon the plate toward and from the ratchet, a pivoted dog carried by the support and adapted to engage the ratchet in one position, and a spring also carried by the support, said spring bearing against the dog on both sides of its pivot.

HERMAN F. KHOENLE.